United States Patent [19]

Miyazaki et al.

[11] 4,234,900
[45] Nov. 18, 1980

[54] GROUND FAULT DETECTOR

[75] Inventors: Yukio Miyazaki; Mitsugu Taketa, both of Itami, Japan

[73] Assignee: Mitsubishi Denki Kabushiki Kaisha, Tokyo, Japan

[21] Appl. No.: 27,018

[22] Filed: Apr. 3, 1979

[30] Foreign Application Priority Data

Apr. 11, 1978 [JP] Japan .................................. 53/42963

[51] Int. Cl.³ ............................................. H02H 3/26
[52] U.S. Cl. ........................................ 361/45; 324/51;
340/651; 361/44–46
[58] Field of Search ......................... 361/44; 340/651;
324/51

[56] References Cited

U.S. PATENT DOCUMENTS

| | | | |
|---|---|---|---|
| 3,953,766 | 4/1976 | Howell et al. ........................ 361/45 |
| 4,037,155 | 7/1977 | Ahmed ............................. 361/44 X |
| 4,150,411 | 4/1979 | Howell ................................... 361/45 |

OTHER PUBLICATIONS

"LM 1850 Ground Fault Interrupter" National Semiconductor Company 1978.
"MC 3426 Ground Fault Interrupter Subsystem" Motorola Semiconductor Products Incorporated 1976.

Primary Examiner—Harry E. Moose, Jr.
Attorney, Agent, or Firm—Wenderoth, Lind & Ponack

[57] ABSTRACT

A sensed current resulting from the occurrence of a ground fault is amplified by a differential amplifier and applied to a waveform shaper after having been delayed. The waveform shaper includes two complementary transistors interconnected into a thyristor and a transistor for amplifying the delayed current from the thyristor to a constant current under the control of a negative feedback transistor. The constant current is applied to a thyristor to turn it on to activate an associated circuit interrupter.

6 Claims, 8 Drawing Figures

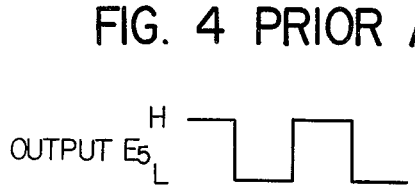
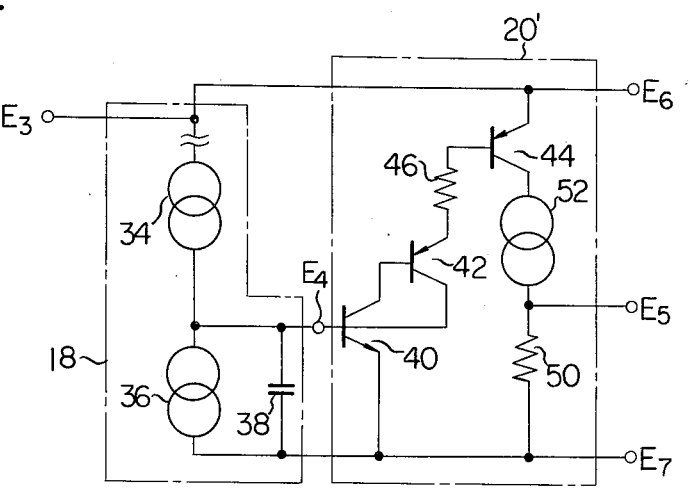
FIG. 4 PRIOR ART
FIG. 5
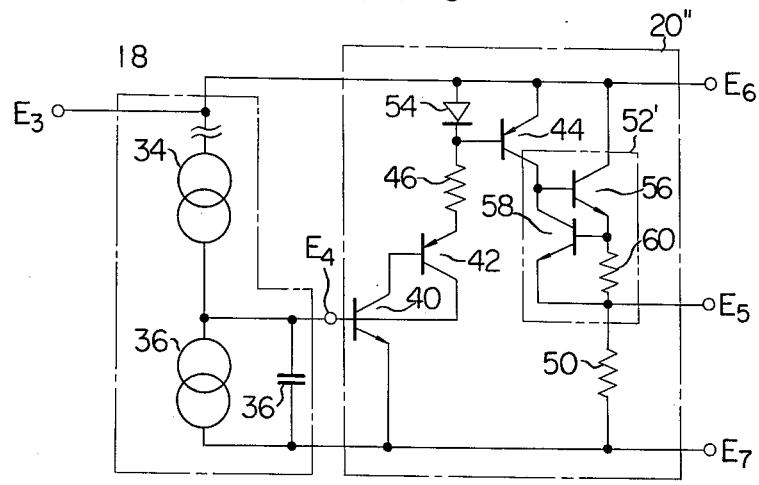
FIG. 6
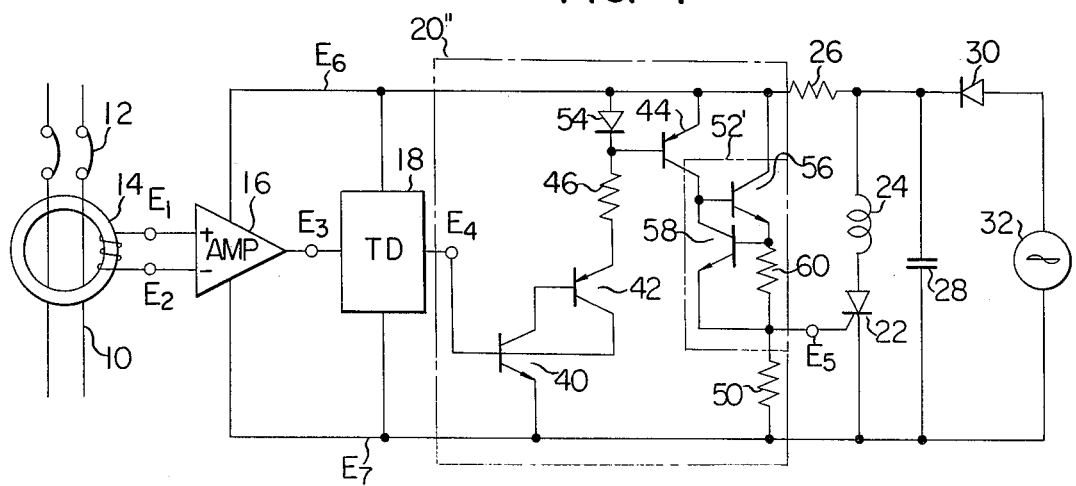
FIG. 7

4,234,900

GROUND FAULT DETECTOR

BACKGROUND OF THE INVENTION

This invention relates to a ground fault detector for use with a leak current interrupter, and more particularly to improvements in a waveform shaper circuit included in a ground fault detector.

Conventional ground fault detectors have been previously formed of mechanical elements but several years ago it is forwarded to compose them of electronic elements because of their poor characteristics. This measure has permitted the zero-phase-sequence component current transformer for converting ground fault currents to corresponding voltages to be made small-sized resulting in the advantage that ground fault detectors can be constructed inexpensively. Electronic ground fault detectors have generally comprised the amplifier for amplifying a signal corresponding to a detected circuit resulting from a ground fault occurring on an associated electric system, the time delay circuit for delaying an output signal from the amplifier, the waveform shaper circuit for shaping a waveform of an output current from the time delay circuit, and the thyristor responsive to an output current from the waveform shaper circuit to be conducting, the conducting thyristor being operative to drive a mating circuit interrupter to interrupt the electric system. Since the waveform shaper circuit supplies the output current to the thyristor through a resistor thereby to put the thyristor in its conducting state, the output current from the wave shaper circuit is decreased when the thyristor is conducting to operate the circuit interrupter. This has resulted in the disadvantage that the waveform shaper circuit can not continue to supply a gate current to the thyristor. This disadvantage has attended with other disadvantages that the ground fault detectors can not be operated in stabilized manner and also the waveform shaper circuit has a high consumed power resulting from the gate current as determined by the resistor connected thereto.

Accordingly, it is an object of the present invention to provide a new and improved ground fault detector including a switching element operative in stabilized manner with a low comsumed power.

It is another object of the present invention to provide a new and improved ground fault detector excellent in temperature characteristics.

SUMMARY OF THE INVENTION

The present invention provides a ground fault detector comprising, in combination, a ground fault sensor for sensing a ground fault occurring in an AC line to produce a sensed current, an amplifier connected to the ground fault sensor to amplify a signal representative of the sensed current, a time delay circuit connected to the amplifier to delay the signal amplified by the amplifier, a waveform shaper circuit connected to the time delay circuit to receive the delayed signal, to be put in its ON state, and a switching element responsive to an output signal from the waveform shaper circuit to be conducting, the waveform shaper circuit being formed of a constant current circuit for decreasing operating currents flowing through the amplifier and the time delay circuit in the ON state of the waveform shaper circuit and supplying at least one portion of the decreased operating current in the form of a constant current to the switching element as a switching current.

Preferably the waveform shaper circuit may include a pair of complementary transistors interconnected into a thyristor, an amplifying transistor connected to the thyristor, and a constant current circuit coupled to the thyristor, the constant current circuit including an amplifier transistor coupled to the thyristor, a negative feedback transistor connected to the amplifier transistor to form a negative feedback loop for the amplifier transistor to cause the latter to amplify an output from the amplifying transistor to the constant current, and an output resistor connected to the amplifier transistor.

BRIEF DESCRIPTION OF THE DRAWINGS

The present invention will become more readily apparent from the following detailed description taken in conjunction with the accompanying drawings in which:

FIG. 4 is a graph illustrating square pulses developed at the output of the waveform shaper circuit in the arrangement shown in FIG. 3 and useful in explaining the disadvantages of the arrangement shown in FIG. 3;

FIG. 5 is a circuit diagram of one embodiment according to the waveform shaper circuit of the present invention with a time delay circuit connected to an input thereof;

FIG. 6 is a circuit diagram similar to FIG. 5 but illustrating a modification of the arrangement shown in FIG. 5;

FIG. 7 is a combined circuit and block diagram of a ground fault detector embodying the principles of the present invention.

Throughout the Figures like reference numerals designate the identical or corresponding components.

DESCRIPTION OF THE PREFERRED EMBODIMENTS

Figure 1:
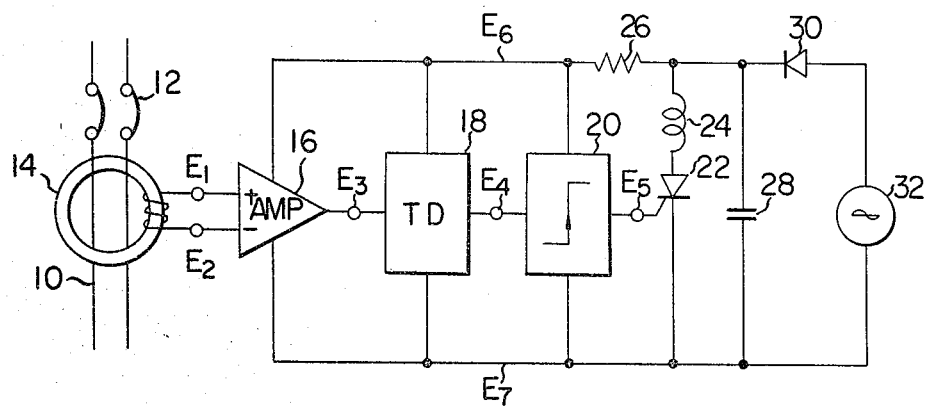
FIG. 1 is a combined circuit and block diagram of a conventional ground fault detector.

Referring now to FIG. 1 of the drawings, there is illustrated a conventional ground fault detector. The arrangement illustrated comprises an AC line 10, a pair of circuit breakers 12 inserted into the AC line, and a zero-shape-sequence component current transformer 14 including a primary winding electromagnetically coupled to the AC line 10. The current transformer 14 includes a secondary winding connected via a pair of output terminals $E_1$ and $E_2$ across a pair of inputs of a differential amplifier 16 subsequently connected through an output terminal $E_3$ to a time delay circuit 18 which is, in turn, connected to a waveform shaper circuit 20 through an output terminal $E_4$. The waveform shaper circuit 20 includes an output terminal $E_5$ connected to a gate electrode of a thyristor 22 including a cathode electrode and an anode electrode connected to an interrupting winding 24 of both circuit interrupters 12 subsequently connected through a voltage dropping resistor 26 to a high voltage lead $E_6$ connected to the amplifier 16, the time delay circuit 18 and the waveform shaper circuit 20.

Then the junction of the interrupting winding 24 and the voltage dropping resistor 26 is connected to one side of a smoothing capacitor 28 subsequently connected across a series combination of a semiconductor rectifying diode 30 and an AC source 32. The diode 30 rectifies an AC output from the source 32 and is so poled that the rectified output is supplied to the thyristor 24 through the interrupting winding 24 and to the waveform shaper circuit 20, the time delay circuit 18 and the differential amplifier 16 through the resistor 26. The junction of the AC source 32 and the other side of the smoothing capacitor 28 is connected to a low voltage lead $E_7$ which is, in turn, connected to the cathode electrode of the thyristor 22, the waveform shaper circuit 20, the time delay circuit 18 and the differential amplifier 16.

Figure 2:
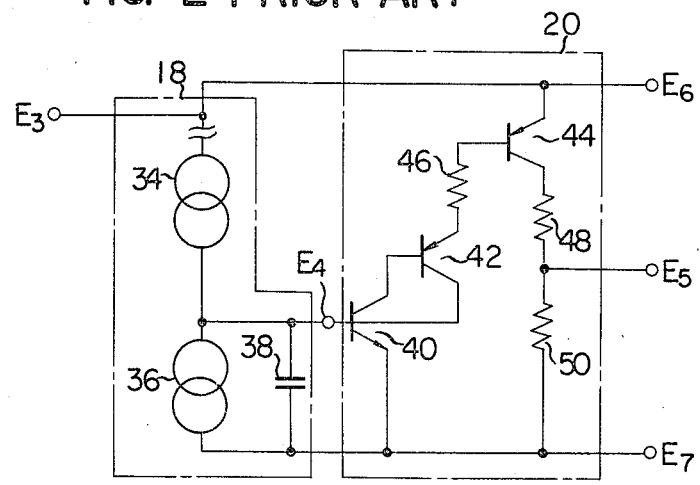
FIG. 2 is a circuit diagram of a conventional time delay circuit and a conventional waveform shaper circuit serially connected thereto which may be used in the arrangement shown in FIG. 1.

The time delay circuit 18 and the waveform shaper circuit 20 may be, for example, of a circuit configuration as shown in FIG. 2. In FIG. 2, th time delay circuit 18 includes a pair of sources of constant current 34 and 36 serially connected across the high and low voltage leads $E_6$ and $E_7$. The source of constant current 34 is connected to the output terminal $E_4$ and also to the terminal $E_7$ through a time delay determining capacitor 38 that is connected across the source of constant current 36.

The source of constant current 34 is operative to make an output also labelled $E_3$ from the differential amplifier 16 predetermined constant current and charge the capacitor 38 with that constant current. When the capacitor 38 is charged to a predetermined voltage or more, the same is enabled whereby the output $E_3$ is delayed by the time delay circuit 18. On the other hand, the source of contatn current 36 is operative to discharge the capacitor 38.

The waveform shaper circuit 20 comprises an NPN transistor 40 including a base and an emitter electrode connected across the capacitor 38 and therefore across the terminals $E_4$ and $E_7$, and a PNP transistor 42 including a base electrode connected to a collector electrode of the NPN transistor 40, a collector electrode connected to the base electrode of the transistor 40, and an emitter electrode connected to a base electrode of another PNP transistor 44 through a resistor 46. The PNP transistor 44 includes an emitter electrode connected to the high voltage lead or terminal $E_6$ and a collector electrode connected to a series combination of resistors 48 and 50 subsequently connected to the emitter electrode of the NPN transistor 40 and also to the low voltage lead or terminal $E_7$. The junction of both resistors 48 and 50 is connected to the output terminal $E_5$. The reference characters $E_5$, $E_6$ and $E_7$ may also designate voltages or potentials at the associated terminals $E_5$, $E_6$ and $E_7$ respectively and the potential $E_6$ is the highest while the potential $E_7$ is the lowest.

In FIG. 2 it is seen that the NPN transistor 40 and the PNP transistor 42 complementary thereto are interconnected into a thyristor. The PNP transistor 44 amplifies an output from the thyristor 40–42 to provide a high voltage or potential at the terminal $E_5$. More specifically, when a voltage at the terminal $E_4$ also serving as an input terminal of the waveform shaper circuit 20, that is to say, a charged voltage across the capacitor 38 increases to be not less than an on-state base-to-emitter voltage of the NPN transistor 40 (which magnitude is about 0.6 volt), that transistor 40 is put in its ON state to draw a base current from the PNP transistor 42. This current is multiplied by factor of $h_{FE}$ by the PNP transistor 42 to provide a base current through the NPN transistor 40. In other words, the thyristors 42 applies the positive feedback to the transistor 40 and are operated in the same manner as thyristors.

Figure 3:
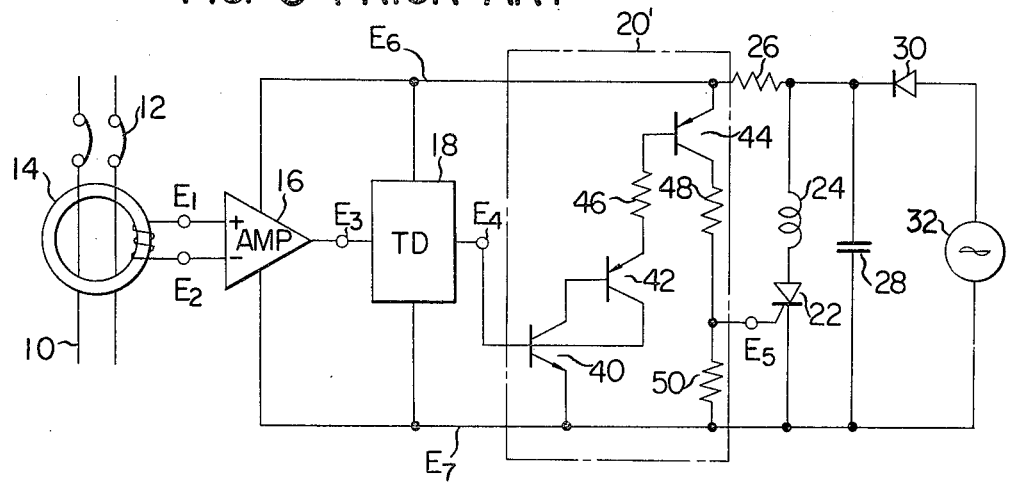
FIG. 3 is a diagram similar to FIG. 1 but illustrating the arrangement of FIG. 1 including the waveform shaper circuit shown in FIG. 2.

By forming the waveform shaper circuit 20 shown in FIG. 1 of the arrangement illustrated in FIG. 2, the conventional ground fault detector takes a circuit configuration as shown in FIG. 3. In the arrangement illustrated the waveform shaper circuit designated by the reference numeral 20' has no current flowing therethrough when no ground fault occurs in the AC line 10. Under these circumstances, the voltage dropping resistor 26 has its magnitude of resistance prelimilarily selected to develop on the high voltage lead $E_6$ a voltage enabled to drive the differential amplifier 16 and the time delay circuit 18.

Upon a ground fault occurring in the electric circuit 10, a potential difference is developed across the output terminals $E_1$ and $E_2$ of the zero-phase-sequence component current transformer 14. This potential difference is amplified by the different amplifier 16. The amplified potential difference or voltage from the amplifier 16 appears at the output terminal $E_3$ and enters the time delay circuit 18. With a predetermined time delay, a voltage at the output terminal $E_4$ of the time delay circuit 18 reaches a predetermined magnitude or the on-state base-to-emitter voltage of the NPN transistor 40, in this case, of about 0.6 volt, whereupon the waveform shaper circuit 20' is put in operation to deliver a high voltage to the output terminal $E_5$ to turn the thyristor 22 on. This turn-on of the thyristor 22 causes a rectified voltage from the AC source 32 to energize the interrupting winding 24 through the now conducting thyristor 22 resulting in the circuit interrupter 12 interrupting the AC line 10.

However it is noted that the waveform shaper circuit 20' has a low output impedance because the resistor 48 serving as an output impedance has a magnitude of resistance selected to be low. Therefore, the voltage at the terminal $E_6$ is lowered to decrease currents flowing through both differential amplifier 16 and the time delay circuit 18. As a result, the current thus decreased forms substantially a gate current applied to the gate electrode of the thyristor 20. Under these circumstances, an output voltage from the waveform shaper circuit 20' is developed at the output terminal $E_5$ until the voltage at the terminal $E_6$ reaches about a magnitude of $2V_{BE}+V_{sat}$ where $V_{BE}$ designates a forward base-to-emitter voltage of each of the PNP transistors 42 and 44 and $V_{sat}$ designates a saturation collector-to-emitter voltage of the NPN transistor 40. In this case, that magnitude is about of 1.6 volts.

However, the waveform shaper circuit 20' has encountered a serious problem in that the voltage at the terminal $E_6$ can not be held at a high voltage and therefore the gate current can continue to flow into the thyristor 22. More specifically, the resistor 48 is required to have a low magnitude of resistance in order to permit the output terminal $E_5$ to supply the gate current required for thyristor 22 even when the voltage at the terminal $E_6$ is lowered. However, if the resistor 48 has a low magnitude of resistance then a high current is drawn from the output terminal $E_5$ when the terminal $E_6$ is put at a high voltage so that the voltage at the terminal $E_6$ becomes less than a minimum voltage required for the output terminal $E_5$ to be held at the high voltage. This results in the turn-off of the waveform shaper circuit 20'. The turn-off the circuit 20' causes an increase in impedance when the terminal E7 is viewed from the terminal E6. As a result, the voltage at the terminal E6 is increased to turn again the waveform shaper circuit 20' on. Accordingly, the voltage at the terminal E5 has a pulse shape such as shown in FIG. 4. As shown in FIG. 4, the voltage at the output terminal E5 is at a high level H when the waveform shaper circuit 20' is in its ON state and at a low level L when the circuit 20' is in its OFF state. Therefore the voltage from the output terminal E5 can not continue to supply the gate current to the thyristor 22. This is a cause for which the thyristor 22 is disabled to be operated in stabilized manner.

With the abovementioned respect in view, the present invention has been completed and includes a source of constant current substituted for the resistor 48 as shown in FIG. 2 or 3.

The arrangement illustrated in FIG. 5 is different from that shown in FIG. 2 only in that in FIG. 5 a source of constant current 52 is substituted for the resistor 48 shown in FIG. 2. In the arrangement illustrated, the voltage at the terminal E4 is increased to the on-state base-to-emitter voltage of the NPN transistor 40 to turn the thyristor 40-42 on as above described in conjunction with FIG. 2 until the PNP transistor 44 is turned on. At that time, a current as determined by the source of constant current 52 flows through the output terminal E5 to the thyristor 22, as a gate current. It is to be noted that this gate current is determined by the source of constant current 52 but not affected by the voltage at the terminal E6.

In the arrangement of FIG. 2, however, the PNP transistor 44 is connected at the collector electrode to the resistor 48 but not to the source of constant current and therefore the current flowing out from the output terminal E5 has changed in accordance with the voltage at the terminal E6 resulting in the unstable operation of the thyristor 22. On the contrary, the arrangement of FIG. 5 ensures the stable operation of th thyristor 22 because the source of constant current 52 substituted for the resistor 48 supplies to the thyristor 22 the gate current as determined by the same.

The arrangement illustrated in FIG. 6 is identical to that shown in FIG. 5 excepting that the source of constant current 52 is replaced by a transistorized constant current circuit generally designated by the reference numeral 52'. As shown in FIG. 6 wherein the waveform shaper circuit is designated by the reference numeral 20'', the PNP transistor 44 has the emitter and base electrodes connected across a semiconductor diode 54 and the collector electrode connected to a base electrode of an NPN transistor 56 which is, in turn, connected to a collector electrode of another NPN transistor 58. The NPN transistor 56 includes a collector electrode connected to the or high voltage lead E6 and an emitter electrode connected to a resistor 60 subsequently connected to the output terminal E5 and to the resistor 50. Then the PNP transistor 58 includes a base and an emitter electrode connected across the resistor 60.

The diode 54 and the PNP transistor 44 forms a current mirror circuit wherein a current flowing through the diode 54 is normally equal to that flowing the transistor 44. On the other hand, the NPN transistors 56 and 58 and the resistor 60 form a constant current circuit 52'.

The thyristor 40-42 is brought into its ON state, a current flows through the diode 54 and the thyristor 10-42. Also the PNP transistor 44 has flowing therethrough a current substantially equal to that through the diode 54. The current flowing through the transistor 44 is amplified by the NPN transistor 56.

Under these circumstances, the current flowing through the resistor 60 is increased until a voltage drop across the resistor 60 is equal to an on-state base-to-emitter voltage $V_{BE}$ of the NPN transistor 58, in this case, of about 0.6 volt. At that time, the NPN transistor 58 is turned on to draw a base current through the NPN transistor 56 tending to decrease the current flowing through the emitter electrode of the NPN transistor 56. In other words, the NPN transistor 58 forms a negative feedback circuit for the transistor 58 to feed negatively an output from the NPN transistor 56 back to its input thereby to maintain the current flowing through the resistor 60 at a constant magnitude $I_{R26}$ expressed by $$I_{R26} = V_{BE}(NPN(58))/R_{26}$$

where $V_{BE}$ (NPN(58)) designates an on-state base-to-emitter voltage of the NPN transistor 58 and $R_{26}$ designates a magnitude of resistance of the resistor 60.

From the above expression it is seen that the current flowing through the resistor 60 has a magnitude independent upon the voltage at the terminal E6 and therefore is maintained constant. Accordingly, the arrangement of FIG. 6 gives the same result as that shown in FIG. 5.

FIG. 7 illustrates a ground fault detector different from that shown in FIG. 3 only in that in FIG. 7, the waveform shaper circuit 20' shown in FIG. 3 is replaced by that illustrated in FIG. 6. Accordingly, both arrangements are substantially identical in operation to each other excepting that, in FIG. 7, the current delivered from the output terminal E5 is maintained at the constant magnitude as determined by the constant current circuit 52'.

More specifically, when a ground fault occurs in the AC line 10, the waveform shaper circuit 20'' is operated as above described to deliver the gating current as determined by the constant current circuit 52 to the thyristor 22 through the output terminal E5. At that time the voltage at the terminal E6 is lowered to decrease the currents flowing through the differential amplifier 16 and the time delay circuit 18. In the arrangement of FIG. 7, however, since the waveform shaper circuit 20'' supplies to the output terminal E5 the constant current as determined by the constant current circuit 52'', that constant current is applied, as a gate current, to the thyristor 22 resulting in the stable operation of the latter.

As the waveform shaper circuit 20'' in its ON state causes a decrease in current flowing through each of the differenctial amplifier 16 and the time delay circuit 18, the voltage at the terminal E6 is determined so that the sum of the current delivered from the output terminal E5 and the currents flowing through the differential amplifier 16 and the time delay circuit 18 during the ON state of the waveform shaper circuit 52' is equal to the currents flowing through the components 16 and 18 when the waveform shaper circuit 52' is on its OFF state.

Figure 8:
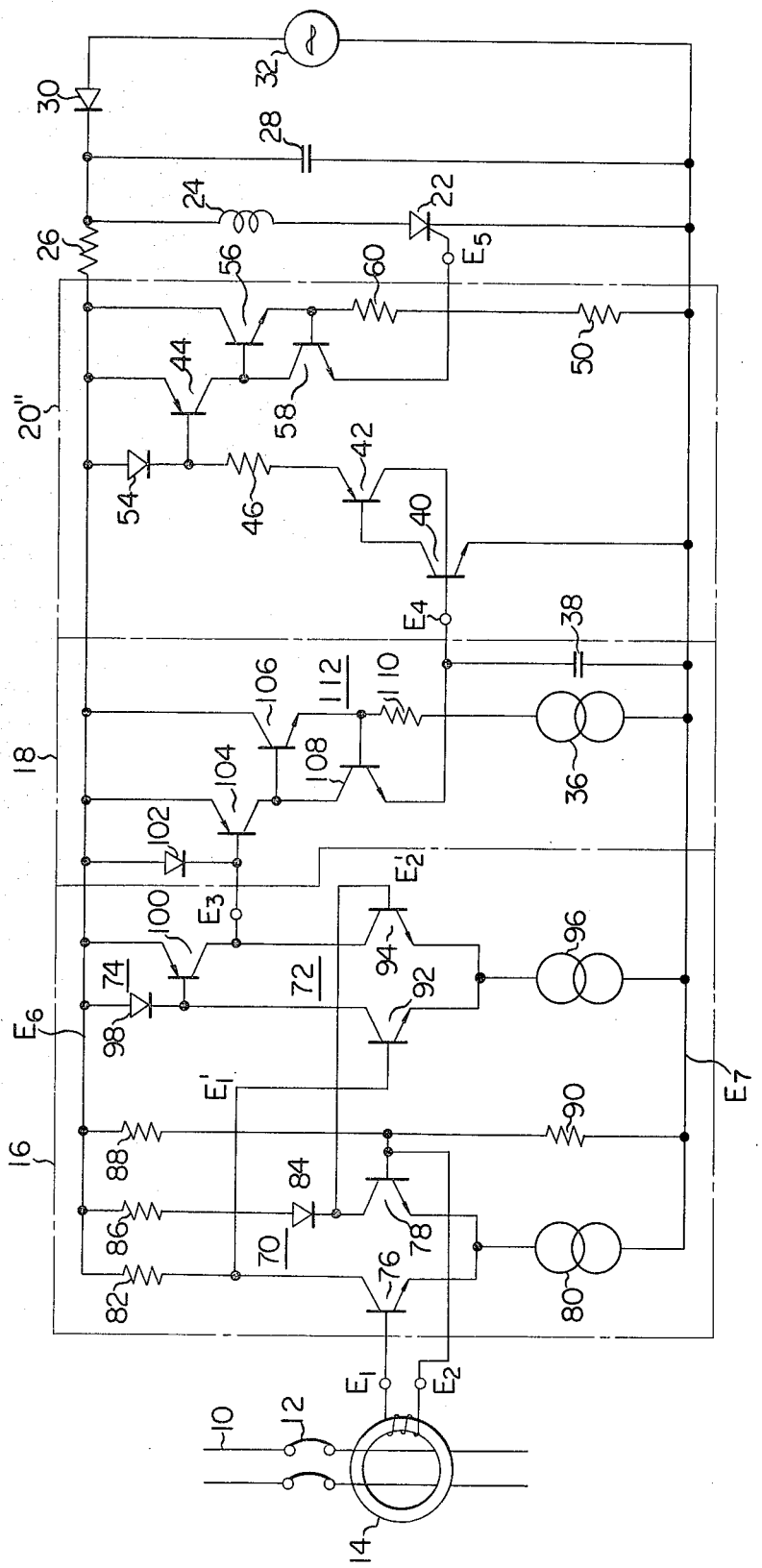
FIG. 8 is a circuit diagram of the details of the arrangement shown in FIG. 7.

The arrangement of FIG. 7 may be preferably of a circuit configuration as shown in FIG. 8. In the arrangement illustrated, the differential amplifier 16 comprises a differential pre-amplifier stage generally designated by the reference numeral 70, a differential post-amplifier stage generally designated by the reference numeral 72 and connected to the differential pre-amplifier stage 70, and a current mirror circuit generally designated by the reference numeral 74 and connected to the differential post-amplifier stage 72.

The differential pre-amplifier stage 70 includes a pair of first and second NPN transistors 76 and 78 symmetrically interconnected in emitter coupling configuration. More specifically, the NPN transistors 76 and 78 includes base electrodes connected to the output terminals $E_1$ and $E_2$ of the zero-phase-sequence component current transformer 14 respectively and emitter electrodes connected together to the low voltage lead $E_7$ through a first source of constant current 80. The transistor 76 has a collector electrode connected to the high voltage lead $E_6$ through a first collector resistor 82 while the transistor 78 has a collector electrode connected to the lead $E_6$ through a semiconductor diode 84 and a second collector resistor 86 serially interconnected. The diode 84 is so poled as to permit a current to flow into the collector electrode of the transistor 78 from the high voltage lead $E_6$. The base electrode of the transistor 78 is connected to the junction of two voltage dividing resistors 88 and 90 serially interconnected across the high and low voltage leads $E_6$ and $E_7$ respectively, thereby to be maintained at a predetermined constant voltage.

The differential post-amplifier stage 72 includes a pair of third and fourth NPN transistors symmetrically interconnected in emitter coupling configuration. More specifically, the NPN transistors 92 and 94 include base electrodes connected to the collector electrodes of the NPN transistors 76 and 78 respectively and emitter electrodes connected together to the low voltage lead $E_7$ through a second source of constant current 96. The transistor 92 inlcudes a collector electrode connected to a cathode electrode of a semiconductor diode 98 including an anode electrode connected to the lead $E_6$ while the transistor 94 includes a collector electrdoe connected to the lead $E_6$ through a collector-to-emitter circuit of a PNP transistor 100. The transistor 100 includes a base electrode connected to its emitter electrode through the diode 98 to form the current mirror circuit 74 with the latter, and a collector electrode connected to the output terminal $E_3$. Thus the third and fourth transistors 92 and 94 are connected between the current mirror circuit 74 and the second source of constant current 96.

In the differential amplifier 16 voltages appearing at the output terminals $E_1$ and $E_2$ of the current transformer 14 are applied as input signals to the base electrodes of the first and second transistors 76 and 78 respectively to be amplified. Amplified signals $E_1'$ and $E_2'$ are developed at the collector electrodes of the transistors 76 and 78 respectively. Those signals $E_1'$ and $E_2'$ are applied to the base electrodes of the transistors 92 and 94. When a potential difference between the input signals applied to the transistors 76 and 78 reaches a magnitude predetermined by a ratio of resistance between the first and second collector resistors 82 and 86, an output signal is developed at the collector electrode of the transistor 94.

In order to improve the temperature characteristic of the amplifier 16, a semiconductor element having a negative temperature coefficient may be serially connected to at least one of the first and second collector resistors 82 and 86 respectively. Such a semiconductor element is shown in FIG. 8 as being the diode 84. Alternatively, a semiconductor element having a negative temperature coefficient may be connected in at least one of leads connecting the resistors 82 and 86 to the base electrodes of the third and fourth transistors 92 and 94 respectively. In the latter case, a voltage developed across the semiconductor element is superposed on the voltage predetermined by the ratio of resistance between the first and second collector resistors 82 and 86.

The output signal $E_3$ is applied via the output terminal $E_3$ to the time delay circuit 18 where it is delayed. The delay circuit 18 includes a semiconductor diode 102, a PNP transistor 104, an NPN transistor 106, an NPN transistor 108 and a resistor 110 interconnected in the same manner as the corresponding components 54, 44, 56, 58 and 60 included in the waveform shaper circuit 20", to form a transistorized constant current circuit generally designated by the reference numeral 112. Thus the transistorized circuit 112 is substantially identical in operation to the constant current circuit 52' as shown in FIG. 6 so that the signal from the differential post-amplifier stage 72 is amplified to a predetermined constant current which, in turn flows through the resistor 110. The resistor 110 is connected to the low voltage lead $E_7$ through the time delay determining capacitor 38 connected across a third source of constant current and also designated by the reference numeral 36. Therefore the constant current flowing through the resistor 110 charges the capacitor 38. Thereafter the process as above described is repeated to interrupt the electric circuit 10.

The third source of constant current 36 serves to discharge the capacitor 38.

If a rise of temperature occurs in the time delay circuit 18 then the constant current flowing through the resistor 110 decreases because an on-state base-to-emitter voltage of the NPN transistor 108 has a negative temperature coefficient. Also the NPN transistor 40 forming an input stage of the waveform shaper circuit 20 has an on-state base-to-emitter voltage whose temperature coefficient is also negative. Therefore the on-state voltage is also decreased in response of the rise of temperature occurring in the time delay circuit 16. As a result, the overall temperature characteristic of the time delay circuit 16 and the waveform shaper circuit 20" directly following the latter is not substantially affected by the rise of temperature. This is true in the case of a decrease in temperature.

Accordingly the arrangement of FIG. 8 is excellent in temperature characteristic and stable in operation.

While the present invention has been illustrated and described in conjunction with a few preferred embodiments thereof it is to be understood that numerous changes and modifications may be resorted to without departing from the spirit and scope of the present invention.

What we claim is:

1. A ground fault detector comprising, in combination, a ground fault sensor for sensing a ground fault occurring in an AC line to produce a sensed current, an amplifier connected to said ground fault sensor to amplify a signal representative of said sensed current, a time delay circuit connected to said amplifier to delay said signal amplified by said amplifier, a waveform shaper circuit connected to said time delay circuit to receive the delayed signal to be put in its ON state, and a switching element responsive to an output from said waveform shaper circuit to be conducting, said waveform shaper circuit being formed of a constant current circuit for decreasing operating currents flowing through both said amplifier and said time delay circuit in said ON state of said waveform shaper circuit and supplying at least one portion of said decreased operating current in the form of a constant current to said switching element as a switching current.

2. A ground fault detector as claimed in claim 1 wherein said waveform shaper circuit includes a pair of complementary transistors interconnected into a thyristor, and a source of constant current for delivering siad constant current.

3. A ground fault detector as claimed in claim 1 wherein said waveform shaper circuit includes a pair of complementary transistors interconnected into a thyristor, and a constant current circuit coupled to said thyristor, said constant current circuit including an amplifier transistor connected to said amplifying transistor connected to said thyristor, a negative feedback transistor connected to said amplifier transistor to form a negative feedback loop for said amplifier transistor of cause said amplifier to amplify an output from said amplifying transistor to said constant current, and an output resistor connected to said amplifier transistor.

4. A ground fault detector as claimed in claim 1 whrein said amplifier comprises a differential pre-amplifier stage including a pair of first and second transistors having an emitter coupling configuration, said first transistor being connected between a first resistor and a first source of constant current and including a base electrode having applied thereto one of a pair of input signals, said second transistor being connected between a second resistor and said first source of constant current and including a base electrode having applied thereto the other of said input signals; and differential post-amplifier stage including a pair of third and fourth transistors having an emitter coupling configuration, and connected between a current mirror circuit and a second source of constant current, said third and fourth transistors including base electrodes connected to collector electrodes of siad first and second transistors respectively, siad amplifier being operative to sense a potential difference between said pair of input signals reaching a predetermined voltage as set by a ratio of magnitude of resistance between said first and second resistors thereby to deliver an output signal therefrom, and wherein said time delay circuit includes a constant current circuit and a time delay determining capacitor serially connected thereto, said constant current circuit including an amplifier transistor connected to said capacitor and a negative feedback transistor connected to said amplifier transistor form a negative feedback loop for said amplifier transistor to so that said amplifier transistor amplifies said output signal from said amplifier to said constant current.

5. A ground fault detector as claimed in claim 4 wherein at least one of said first and second resistors is serially connected to a semiconductor element having a negative temperature coefficient.

6. A ground fault detector as claimed in claim 4 wherein a semiconductor element is connected in at least one of leads connecting said first and second resistors to said base electrodes of said third and fourth transistors respectively.

* * * * *